United States Patent [19]

McCaffrey

[11] Patent Number: 4,792,299
[45] Date of Patent: Dec. 20, 1988

[54] BISCUIT CUTTER AND COOPERATIVE MOLD

[76] Inventor: Charles N. McCaffrey, P.O. Box 2001, Hattiesburg, Miss. 39401

[21] Appl. No.: 91,669

[22] Filed: Sep. 1, 1987

[51] Int. Cl.[4] .................. B29C 69/00; A21C 11/10
[52] U.S. Cl. .............................. 425/289; 30/130; 30/301; 30/305; 30/315; 30/316
[58] Field of Search ............... 425/289, 292; 426/503; 30/130, 301, 315, 305, 316

[56] References Cited

U.S. PATENT DOCUMENTS

| 337,329 | 3/1886 | Hewett | 30/301 |
|---|---|---|---|
| 414,452 | 11/1989 | Sidway | 30/301 |
| 1,172,057 | 2/1916 | Scherffius | 30/306 |
| 1,299,802 | 4/1919 | Smith | 30/301 |
| 1,399,449 | 12/1921 | Trethewey | 30/301 |
| 1,477,693 | 12/1923 | Clark | 30/301 |
| 2,137,811 | 11/1938 | Royal | 30/130 |
| 2,290,648 | 7/1942 | McCain | 30/301 |
| 2,526,811 | 10/1950 | Dawson | 83/109 |
| 3,234,895 | 2/1966 | Leiby | 426/503 |
| 3,872,757 | 3/1975 | Hargadon | 426/503 |
| 4,362,497 | 12/1982 | Lifshitz | 425/292 |
| 4,382,768 | 5/1983 | Lifshitz et al. | 425/292 |
| 4,516,923 | 5/1985 | Lifshitz et al. | 425/289 |
| 4,606,716 | 8/1986 | McCaffrey | 425/289 |
| 4,664,928 | 5/1987 | McCaffrey | 426/503 |

FOREIGN PATENT DOCUMENTS 203375 9/1956 Australia ................ 30/301

Primary Examiner—Willard Hoag
Attorney, Agent, or Firm—Dowell & Dowell

[57] ABSTRACT

A biscuit cutter having at least one cutting element defined by a hexagonally oriented cutting edge which taper upwardly and inwardly to form a circular biscuit forming cavity and which cutting element may be cooperatively seated within a mold so as to uniformly cut substantially all of the dough placed within the mold into uniform circular shapes without leaving any waste dough to be reworked or reprocessed.

13 Claims, 3 Drawing Sheets

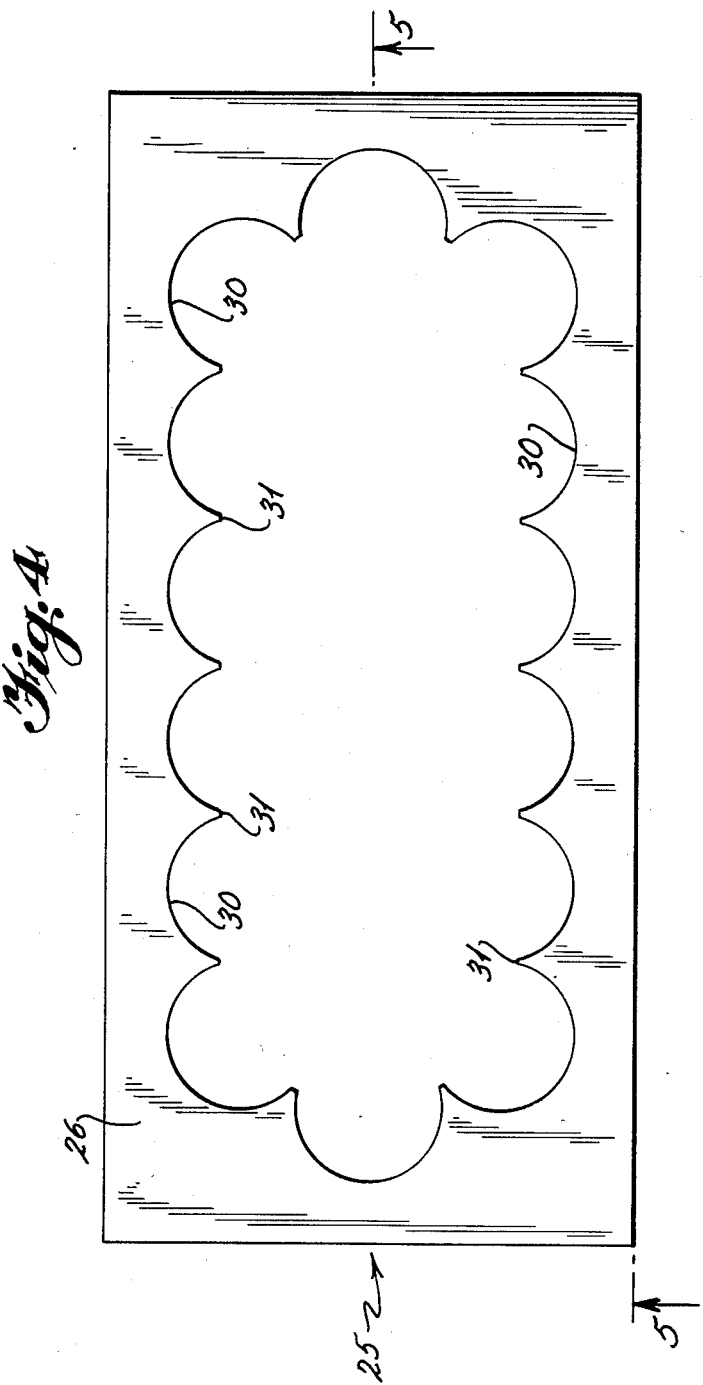

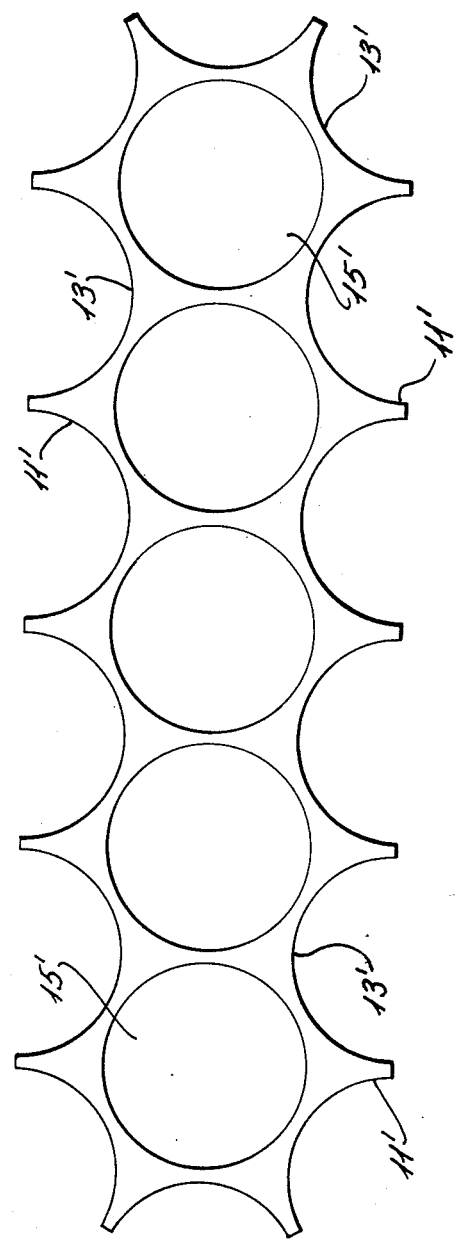

BISCUIT CUTTER AND COOPERATIVE MOLD

BACKGROUND OF THE INVENTION

1. Field of the Invention

This invention is generally directed to food preparation equipment of the type including cutters and molds used in processing and shaping dough to form biscuits, cookies, cakes and the like and particularly to dough cutters and cooperative molds which may be utilized to form or cut a plurality of individual shapes from a batch of dough without leaving excess dough to be reworked or discarded. The cutting elements of the present invention may include a single cutter having angularly related linear cutting edges which taper upwardly to define a single circular biscuit forming or shaping cavity. The cutting element may be used with a cooperatively shaped mold which may in one embodiment include a plurality of arcuately shaped wall portions and in a second embodiment may include a plurality of angularly related straight wall portions.

2. History of the Related Art

In applicant's prior U.S. Pat. Nos. 4,606,716 issued Aug. 19, 1986 and 4,664,928 issued May 12, 1987, a mold and biscuit cutter and method for molding and making biscuits is disclosed which enables a batch of dough to be cut and shaped without leaving any waste dough to be reworked or rebatched in a subsequent cutting or molding process. In today's fast food industry, there is a need to reduce costs by conserving food ingredients and reducing the amount of waste materials associated with the food preparation process. As discussed in applicant's prior patents, the teachings of which are incorporated herein by reference, it is possible to almost eliminate waste dough from the preparation of biscuits by utilizing specially shaped biscuit cutters which are utilized with cooperatively shaped mold elements.

As taught in applicant's aforementioned patents, a prepared batch of dough may be placed in a specially shaped mold element and thereafter a cutter element cooperatively seated with respect to the mold thereby severing the batch of dough into a plurality of equally shaped segments without leaving any excess dough to be reworked or reshaped with a subsequent batch of dough. In the patents, it is noted that in order to provide an end product which is aesthetically pleasing to the consuming public, i.e. edible products having a generally circular shape, it is preferred that the mold and cutter elements be formed so as to define generally hexagonally shaped wall segments. It is possible that additional wall segments could be utilized so long as the mold and cutter elements cooperatively seat with one another and so long as each of the dough segments when cooked assumes a generally circular configuration.

In order to further increase the aesthetic quality of a biscuit, cookie or other baked product, applicant has now developed a cutter which may be utilized with a cooperative mold which will form the edible product into a more circular shape upon being heated and cooked. There are numerous prior art patents and other disclosures of cutting elements having generally circular molds and cutting edges. Some examples o such prior art cutters are disclosed in U.S. Pat. Nos. 414,452 to Sidway, 1,172,057 to Scherffius, 1,299,802 to Smith, 1,399,449 to Trethewey, 1,477,693 to Clark and 2,526,811 to Dawson. In each of the foregoing references, a cutter or mold is disclosed having one or more circular shaped molds or cutting elements associated therewith. Although the cutters may be utilized to form uniform circular shapes, when forming such shapes there has been no consideration to insuring that no waste material is left from each cutting process. Unfortunately, the nature of the circular shape itself leads to a great deal of excess material being left with each batch of dough as the circular patterns may only be closely associated with respect to one another in various patterns having a plurality of gaps formed therebetween such as clearly shown in the referenced patent to Trethewey. Therefore, although these cutters provide for aesthetically pleasing circularly shaped comestible products, they do not provide structures which will alleviate the formation or creation of waste dough or other material which must be either discarded or subsequently reworked with another batch of dough or similar comestible product.

In applicant's prior patents, biscuit cutters and molds were disclosed which practically eliminated any waste material from being processed from one batch of dough to another. With the structures being utilized, a plurality of angularly related wall portions were secured to one another so as to cut the dough within the mold in such a manner that no waste material was left. Prior to applicant's invention, the prior art had recognized that various shapes of cutters could be provided so as to eliminate waste between each of the separate cutter elements. Such structures are disclosed in U.S. Pat. No. 337,329 to Hewett and Australian Pat. No. 203375 to Whalley. It should be noted that in these references, there is no suggestion of incorporating a mold to retain the material so that the mold and cutters cooperate to insure that no excess dough remains surrounding the cutting elements as is the case with applicant's prior inventions.

In addition to the foregoing, applicant is also aware of prior art as disclosed in U.S. Pat. Nos. 3,872,757 to Hargadon and 4,516,923 to Lifshitz et al. The reference to Hargadon discloses a cutter having a plurality of shaped cutter and mold elements which are in the general configuration of hexagons having a plurality of angularly oriented side wall portions The uppermost edge of each of the mold elements is tapered inwardly to form a generally circular flange which fits through a supporting sheet so that the hexagon molds and cutting elements can be selectively carried by the supporting sheet. In the use of such a cutter and mold, as the side walls of each of the molds is generally flat and the molds hexagonally cross sectioned, any biscuits or other comestible products formed therein would assume an initial hexagonal configuration similar to that formed by applicant's prior patents and as disclosed by several of the above discussed prior art references.

The patent to Lifshitz et al. discloses a double molding board which includes hexagonal cutting edges on which a dough material is initially spread and cut. Circular openings are provided adjacent each of the cutting edges in order to provide access to force material from the cavities defined by the hexagonal cutting edges by allowing the opposing feet or studs attached to an adjoining section of the mold to pass therethrough as the mold sections are closed with respect to one another.

In view of the foregoing, the prior art has not recognized the need to provide both a cutter and mold for comestible products including dough for making biscuits, cookies, cakes and the like which both assures a pleasing round configuration of the product both prior to and after being heated or cooked and which also enables the product to be prepared without waste or reworking of the initial dough material.

SUMMARY OF THE INVENTION

This invention is directed to a cutter for use in severing a batch of dough into a plurality of generally equally shaped circular configurations prior to the dough being heated or cooked and wherein the cutter may be cooperatively used with the mold so as to insure that the entire batch of dough is cut without leaving any waste materials to be reworked or rebatched. The cutter element includes at least one cavity of a generally circular configuration in which the dough is confined as it is cut from a batch of such material. The side walls which define the cavity of the cutter element are tapered outwardly as they approach the cutting edges with the cutting edges being formed in straight line configurations which are angularly related with respect to one another. The cutting edges are preferably formed in a hexagonal configuration although other multi-sided configurations may be utilized. With the exception of the cutting edges which are formed in straight line configurations, the remaining internal side wall portions of the cutter cavity are generally circular so that the product cut from a batch of dough will be formed in a generally circular configuration along a substantial portion of the height of the product.

The cutter element may be formed with a single dough forming cavity or may take the configuration of a plurality of cavities which are integrally associated in a pattern side by side relationship whereby the cutting edges of one cavity serve simultaneously as the cutting edge of an adjacent cavity. In this manner, as the entire form is urged into a dough-like material, the straight cutting edges will insure that no waste material is left between the cavities Further, as the cutting edges are pushed through a batch of dough, the cavities therein will form the dough into a plurality of uniform circular configurations.

To further insure that no waste dough is left for reprocessing, the cutting elements of the present invention may be cooperatively utilized with specially shaped molds which may have either generally semi-circular shaped side wall portions or straight line wall portions depending upon the overall configuration of the cutting element. It is only necessary that the mold and the cutting elements cooperate to insure that the entire batch of dough which is spread into the mold be cut into a plurality of equally shaped portions without leaving any waste material.

It is the primary object of the present invention to provide a cutter element which is specially designed to eliminate waste and yet form a batch of dough-like material into a plurality of uniformly shaped products having substantially circularly shaped cross sections.

BRIEF DESCRIPTION OF THE DRAWINGS

FIG. 4 is a top plan view of one form of mold which may be utilized with the shape of cutting element shown in FIG. 1 of the drawings.

FIG. 5 is a cross sectional view having portions broken away taken along lines 5—5 of FIG. 4.

FIG. 8 is a top plan view of a second cutter element of the present invention showing a plurality of cutting cavities being associated with a common support.

DESCRIPTION OF THE PREFERRED EMBODIMENT

Figure 1:
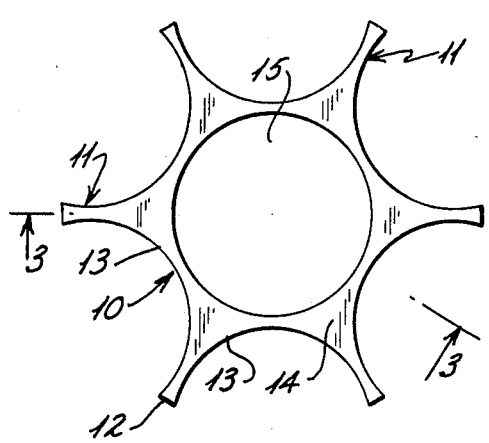
FIG. 1 is a top plan view of a single cutting element of the present invention.

With continued reference to the drawings, the cutter elements of the present invention will be discussed as they are utilized separately and together with cooperatively shaped molds. A first form of cutting element is disclosed in FIGS. 1-3 and includes a central body portion 10 which is generally circular in configuration A plurality of outwardly extending arms are integrally formed with the central body portion and are generally equally spaced around the periphery thereof. Each of the arms 11 includes an outer end 12 with the outer ends of adjacent arms being interconnected by arcuate concave wall portions 13. The upper surface 14 of the cutting element is shown as being generally planar in configuration with a circular opening 15 being defined by the central body portion of the cutter.

Figure 2:
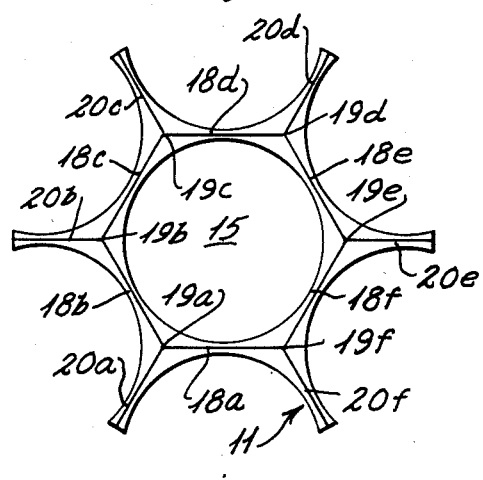
FIG. 2 is a bottom plan view of the cutting element of FIG. 1.

With particular reference to FIG. 2 of the drawings, the bottom 16 of the central body portion of the cutting element is defined by a plurality of interconnecting cutting edges 18a–18f which intersect at spaced points 19a–f. The bottom surface of each of the arm portions 11 also include a linear cutting edge 20a–20f which also intersect with the cutting edges of the central body portion at points 19a–f.

Figure 3:
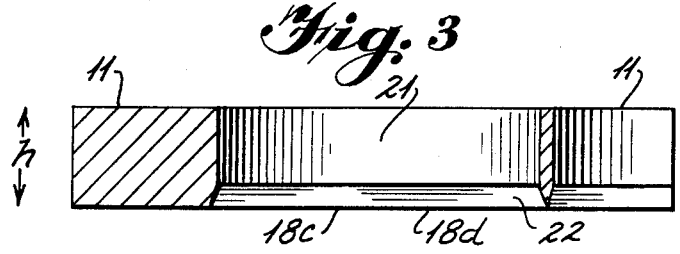
FIG. 3 is an enlarged cross sectional view taken along lines 3—3 of FIG. 1.

With reference to FIGS. 2 and 3, it is noted that the inner cylindrical wall portion 21 which defines a cutting element cavity 15 is generally circular in cross section throughout a substantial portion of the height h of the cutting element from the upper surface to the lower cutting edges thereof. The lowermost portion 22 of the side walls defining the cavity are tapered outwardly along their length from a point spaced below the center of the height of the cutting element as shown in FIG. 3 to define the cutting edges shown at 18a–18f. No more than one half of the height h of the cutting element should be shaped with a tapering wall portion so that when the cutting element is used, a substantial portion of the cavity 15 will have the shape of a cylinder or be of circular cross section so as to insure that the product being severed is substantially circular with the only bottom portion of the segmented biscuit or other food product having the straight line configuration which would conform to a hexagon as shown in FIG. 2 of the drawings. Preferably, the lowermost portion 22 of the side wall should be less than one-third of the height of the cutting element. In a like manner, each of the wall portions 13 of the arms 11 has an arcuate upper wall section 13' and lower outwardly tapering wall section 13" which extends from the intersection of the upper wall section 13' to the adjacent cutting edges 20 and 18. The length of the lower wall sections are equal to the height of the tapering lowermost wall portions 22 of the side walls 21.

It should be noted that although the cutting element of FIG. 1 is shown as having a lower cutting edges of a hexagonal configuration, other straight line configurations could also be used. In order to insure uniformity and to make tee cutting element cooperatively receivable with product receiving molds, as will be discussed in greater detail hereinafter, it is envisioned that the number of cutting edges should be an even number with the minimum preferably being six.

In use of the cutting element of FIG. 1, the batch of dough is spread on a cutting surface. As the cutting element is urged with the cutting edges 18 in engagement with the dough, the dough will be severed with the separated portions of dough being urged upwardly into the cavity 15 of the cutting element. Due to the shape of the cutting element, the bottom portion of this severed product will assume the generally straight line configuration or pattern similar to the shape of the cutting edges. The remaining portion of the severed product will have a generally circular configuration thereby insuring that the product when heated and cooked will assume a more uniform circular configuration which will be more aesthetic to the consuming public.

It should also be noted that although the arms 11 are shown as being integrally formed with the central portion of the cutting element, the cutting element could be formed without the arms and a handle could be provided extending over the cavity 15 so as to permit easy manipulation of the cutting element with respect to the cutting surface.

As previously discussed, although the cutters of the present invention may be utilized by themselves to sever rolled dough into a circular configuration, it is preferred that the cutters be utilized with a complementary mold which will contain a specific amount of dough or other comestible product which is to be cut. With reference to FIGS. 4-7, one form of mold 25 is disclosed in greater detail. The mold 25 includes a generally rectangular frame having generally planar upper and lower surfaces 26 and 27, respectively. An enlarged opening 28 is provided through the central portion of the mold with the side walls defining the opening being formed by a plurality of adjoining semicircular wall segments 30. Each of the semicircular wall segments terminates with an adjacent segment along a ledge portion 31. As shown in FIG. 5, it may be preferred to bevel the lower portion of each of the ledges 31 so as to make the ledges coincide in taper and shape with the lowermost tapered wall portions 22 define by the inside wall of the cutting element.

Figure 6:
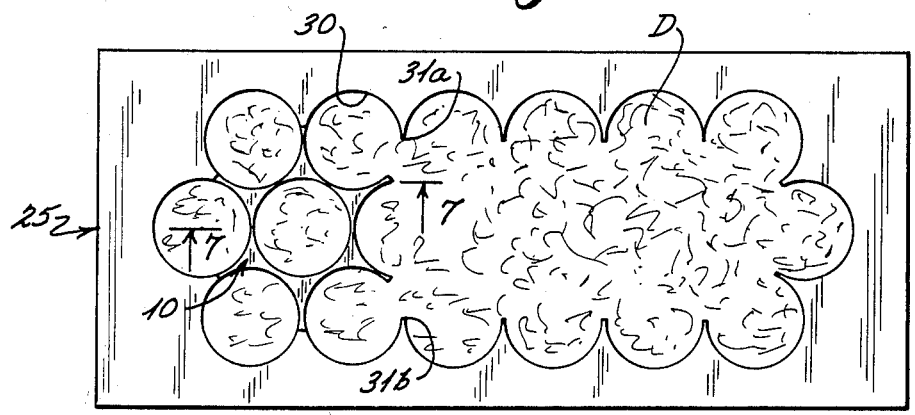
FIG. 6 is an illustrational view of the mold of FIG. 4 showing a batch of dough being placed therein with the cutter element of FIG. 1 being utilized to sever the dough into substantially equal circular shapes.
Figure 7:
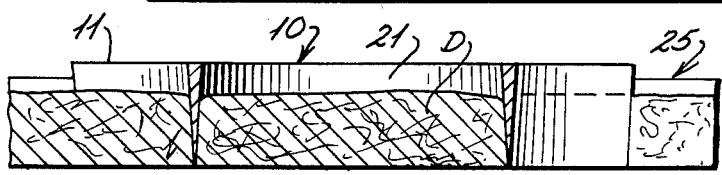
FIG. 7 is an enlarged cross sectional view taken along lines 7—7 of FIG. 6.

With reference to FIGS. 6 and 7, the mold 25 is placed on a supporting surface and thereafter dough material D is uniformly spread within the cavity formed by the opening 28 and defined by the outer semicircular side walls 30. The dough is worked to an equal height throughout the entire cavity so as to insure that the biscuits or other items being severed therefrom will be of equal weight and volume. Thereafter, the cutting element 10 shown in FIG. 1 is placed in alignment with the outer arm portions thereof aligning with the ledge wall portions 31 of the mold and the cutter element is thereafter urged through the dough material until the cutting edges have contacted the supporting surface. The cutter is thereafter withdrawn and positioned so that the outwardly extending arms 11 are aligned with the next set of opposing ledges as shown at 31a and b in FIG. 6. By sequentially moving the cutter element across the cutter form or mold, the entire batch of dough will be cut into a plurality of equally shaped biscuits or other comestible products which are of generally uniform circular configuration along a substantial portion of their height. This will assure that when the cut biscuits or other products are cooked, they will assume a more unified circular appearance. As shown in FIG. 7, it is preferred that the cutter is slightly greater in height than the cooperating mold so as to insure that the upper edges of the cutter may be engaged to lift it from the dough after the dough has been severed Again, a handle may be provided to facilitate the operation and manipulation of the cutting element.

In order to facilitate the cutting of large batches of dough-like material, it may be possible to form a plurality of the cutting elements 10 as a single unit which would fit within the mold shown in FIG. 6. Such a cutter would have the general configuration as defined by the cutter shown in FIG. 8 of the drawings. Such cutter would have a plurality of arms 11' joined by semi-circular wall portions 13' which will define a plurality of cutter cavities 15'.

The cutting elements of the present invention are preferably formed of a stainless steel material suitable for durability and easy cleaning, however, various rigid plastic materials could also be used.

I claim:

1. A biscuit cutter for cutting dough comprising a body portion having upper and lower surfaces, said body portion defining at least one generally cylindrical inner wall defining an open cavity therein, said upper section of said inner wall being generally circular in cross section, said lower section of said inner wall tapering continuous and arcuately outwardly from said upper section to said lower surface of said body portion, said lower section being annular in cross section, said lower surface of said body portion being defined by a plurality of linear cutting edges which intersect with one another at a plurality of spaced points, said inner wall being continuous and smooth throughout said upper and lower sections whereby the dough is cut into substantially circular shapes.

2. The biscuit cutter of claim 1 in which said body portion is defined having a predetermined height, said lower section of said inner wall of said body portion being defined by a height which is less than one half of said predetermined height.

3. The biscuit cutter of claim 2 in which said lower section of said inner wall of said body portion is no greater than one-third of said predetermined height of said body portion.

4. The biscuit cutter of claim 2 including at least six longitudinally extending cutting edges, each of said cutting edges being of substantially equal length with respect to one another.

5. The biscuit cutter of claim 4 in which said body portion includes a plurality of generally cylindrical inner walls defining a plurality of open cavities of substantially continuous annular cross section.

6. The biscuit cutter of claim 4 including a plurality of outwardly extending arms integrally formed with said body portion, each of said arms extending radially outwardly from said body portion from each of said spaced points of intersection between said linear cutting edges, each of said arm portions having an outermost end, each of said outermost ends being joined with an outermost end of an adjacent arm by a semi-circular wall portion, each of said arms having an upper and lower surface, said lower surface of each of said arms being defined by second linear cutting edges, said second linear cutting edges extending outwardly from said spaced points of intersection between said linear cutting edges of said body portion, and each of said semi-circular wall portions having upper and lower sections, said lower section tapering outwardly from said upper section toward said second linear cutting edges.

7. The biscuit cutter of claim 6 in which said lower section of said semi-circular wall portions are of a height generally equal to the height of said lower section of said inner wall by said body portion.

8. The biscuit cutter of claim 6 including a mold, said mold having an enlarged opening therein, said enlarge opening being defined by a plurality of arcuate side walls, inwardly extending ledge means formed between each of said arcuate side walls, said arms of said body portion being selectively alignable with said ledge means of said mold so that said semi-circular wall portions of said body will align with said arcuate side walls of said mold to thereby create a plurality of secondary circular cavities therebetween.

9. A combination biscuit cutter and mold for cutting and forming dough comprising a cutter having a body portion having upper and lower surfaces, said body portion defining at least one generally cylindrical inner wall defining an open cavity therein, said inner wall having upper and lower sections, said upper section of said inner wall being generally circular in cross section, said lower section of said inner wall tapering continuously and arcuately outwardly from said upper section to said lower surface of said body portion, said lower section being annular in cross section, said lower surface of said body portion being defined by a plurality linear cutting edges which intersect with one another at a plurality of spaced points said inner wall being continuous and smooth through said upper and lower sections a plurality of outwardly extending arms integrally formed with said body portion, each of said arms extending radially outwardly from said body portion from each of said spaced points of intersection between said linear cutting edges, each of said arm portions having an outermost end, each of said outermost ends being joined with an outermost end of an adjacent arm by a semi-circular wall portion, each of said arm having an upper and lower surface, said lower surface of each of said arms being defined by second linear cutting edges, said second linear cutting edges extending outwardly from said spaced points of intersection between said linear cutting edges of said body portion, a mold, said mold having an enlarged opening therein, said enlarged opening being defined by a plurality of arcuate side walls, inwardly extending ledge means formed between each of said arcuate side walls, said arms of said body portion being selectively alignable with said ledge means of said mold so that said semi-circular wall portions of said body will align with said arcuate side walls of said mold to thereby create a plurality of secondary circular cavities therebetween.

10. The biscuit cutter of claim 7 in which said body portion is defined having a predetermined height, said lower section of said inner wall of said body portion being defined by a height which is less than one half of said predetermined height.

11. The biscuit cutter of claim 9 including at least six longitudinally extending cutting edges, each of said cutting edges being of substantially equal length with respect to one another.

12. The biscuit cutter of claim 10 in which said body portion includes a plurality of generally cylindrical inner walls defining a plurality of open cavities of substantially continuous annular cross section.

13. The biscuit cutter of claim 10 in which each of said semi-circular wall portions having upper and lower sections, said lower section tapering outwardly from said upper section toward said second linear cutting edges, said lower section of said semi-circular wall portions being of a height generally equal to the height of said lower section of said inner wall by said body portion.

* * * * *